(12) United States Patent
Jolly et al.

(10) Patent No.: US 11,947,052 B2
(45) Date of Patent: Apr. 2, 2024

(54) METHODS AND APPARATUS FOR PARTICLE BEAM DOSE PROFILE MEASUREMENT

(71) Applicant: UCL Business Ltd., London (GB)

(72) Inventors: Simon Jolly, London (GB); Raffaella Radogna, London (GB); Laurent Kelleter, London (GB)

(73) Assignee: UCL Business Ltd., London (GB)

(*) Notice: Subject to any disclaimer, the term of this patent is extended or adjusted under 35 U.S.C. 154(b) by 0 days.

(21) Appl. No.: 17/767,665

(22) PCT Filed: Oct. 9, 2020

(86) PCT No.: PCT/GB2020/052523
§ 371 (c)(1),
(2) Date: Apr. 8, 2022

(87) PCT Pub. No.: WO2021/069922
PCT Pub. Date: Apr. 15, 2021

(65) Prior Publication Data
US 2022/0365225 A1     Nov. 17, 2022

(30) Foreign Application Priority Data
Oct. 10, 2019  (GB) .................................. 1914654

(51) Int. Cl.
*G01T 1/02* (2006.01)
*G01T 1/29* (2006.01)

(52) U.S. Cl.
CPC ............ *G01T 1/023* (2013.01); *G01T 1/2914* (2013.01)

(58) Field of Classification Search
CPC ............................ G01T 1/023; G01T 1/2914
See application file for complete search history.

(56) References Cited

U.S. PATENT DOCUMENTS 6,281,509 B1 * 8/2001 Ryan .................... A61N 5/1048
                                                           250/397
9,140,810 B2 * 9/2015 Karonis .................. G01T 1/201
                              (Continued)

FOREIGN PATENT DOCUMENTS

EP       2367027 A2      9/2011
WO    2015189601 A1     12/2015

OTHER PUBLICATIONS

Boon et al., "Fast 2D phantom dosimetry for scanning proton beams," Medical Physics, vol. 24, No. 4, The American Association of Physicists in Medicine, Apr. 1998, pp. 464-475.

(Continued)

*Primary Examiner* — Hugh Maupin
(74) *Attorney, Agent, or Firm* — Shumaker & Sieffert, P.A.

(57) ABSTRACT

Examples of the present disclosure relate to a particle beam dose profile measurement apparatus comprising a particle detector stack comprising a plurality of scintillator layers. Each scintillator layer of the detector stack is disposed along an axis of the apparatus such that the axis projects through each layer. Each scintillator layer is configured to produce scintillation light indicative of an energy deposition, in that scintillator, of a particle beam incident upon the detector stack along said axis. The apparatus comprises readout circuitry configured to measure the scintillation light of each scintillator layer; and dose profile determination circuitry configured to determine a dose profile of said particle beam within the detector stack. Said determining is based on the measured scintillation light of each scintillator layer, and a quenching correction.

18 Claims, 6 Drawing Sheets

(56) References Cited

U.S. PATENT DOCUMENTS

| | | | |
|---|---|---|---|
| 9,322,927 B2* | 4/2016 | Lee | G01T 1/02 |
| 2007/0181815 A1* | 8/2007 | Ebstein | G01T 1/023 |
| | | | 250/370.11 |
| 2009/0236510 A1* | 9/2009 | Lacroix | G01T 1/02 |
| | | | 250/252.1 |
| 2013/0221213 A1* | 8/2013 | Takayanagi | A61N 5/1075 |
| | | | 250/252.1 |
| 2015/0071408 A1 | 3/2015 | Ebstein | |
| 2015/0099918 A1 | 4/2015 | Takayangagi et al. | |
| 2015/0168563 A1* | 6/2015 | Lee | G01T 1/02 |
| | | | 250/393 |
| 2016/0033659 A1 | 2/2016 | Coutrakon et al. | |
| 2016/0103227 A1* | 4/2016 | Beddar | G01T 1/29 |
| | | | 250/361 R |

OTHER PUBLICATIONS

Christensen et al., "Ionization quenching in scintillators used for dosimetry of mixed particle fields," Journal of Physics in Medicine & Biology, vol. 64, IOP Publishing, Apr. 29, 2019, 13 pp.

Combined Search and Examination Report under Sections 17 and 18(3) from counterpart British Application No. 1914654.7, dated Mar. 30, 2020, 5 pp.

International Search Report and Written Opinion from International Application No. PCT/GB2020/052523, dated Oct. 9, 2020, 15 pp.

Metzkes et al., "A scintillator-based online detector for the angularly resolved measurement of laser-accelerated proton spectra," Review of Scientific Instruments, vol. 83, American Institute of Physics, Dec. 6, 2012, 7 pp.

Search Report under Section 17 from counterpart British Application No. 1914654.7, dated Apr. 7, 2020, 5 pp.

Testa, "Charged particle therapy, ion range verification, prompt radiation," Physics, Universite Claude Bernard—Lyon I, English, <tel-00556628>, Oct. 14, 2010, 145 pp.

International Preliminary Report on Patentability from International Application No. PCT/GB2020/052523, dated Apr. 21, 2022, 8 pp.

* cited by examiner

METHODS AND APPARATUS FOR PARTICLE BEAM DOSE PROFILE MEASUREMENT

This application is a national stage application under 35 U.S.C. § 371 of PCT Application No. PCT/GB2020/052523, filed Oct. 9, 2020, which claims the benefit of Great Britain Application No. 1914654.7, filed Oct. 10, 2019. The entire contents of each of PCT Application No. PCT/GB2020/052523 and Great Britain Application No. 1914654.7 are incorporated herein by reference.

The presented technique relates to the field of measurement of properties of particle beams. More particularly, it relates to the measurement of a dose profile of a particle beam.

It may be desirable to measure properties or characteristics of particle beams, for example those used for particle beam therapy. Particle beam therapy is a radiotherapy technique in which ion beams are used for cancer treatment. Particle beam therapy has many advantages compared with photon or electron beam radiotherapy. In particular, the energy deposition density along the beam path has a pronounced peak, known as a Bragg peak, which can be controlled to maximise the energy deposition dose in a tumour being treated and to minimise the dose to healthy tissues.

In order to ensure that a particle beam is behaving correctly, testing may be performed. For example, in the case of particle beam therapy, a regular (for example daily) quality assurance (QA) program may be performed to verify the beam characteristics and thereby to ensure correct delivery of therapies and to maintain patient safety. Similarly, other particle beam facilities may perform regular QA programs.

Time that is set aside for testing is typically not available for the primary purpose of a given particle beam system. For example, during performance of a QA program a clinical particle beam therapy system is typically unavailable for performing therapies. A reduction in the time used for QA thus makes more time available for treating patients. There is thus a desire for an improved apparatus and method for measuring properties of charged particle beams.

In one example configuration, there is provided an apparatus comprising a particle detector stack comprising a plurality of scintillator layers, wherein each scintillator layer of the detector stack is disposed along an axis of the apparatus such that the axis projects through each layer. Each scintillator layer is configured to produce scintillation light indicative of an energy deposition, in that scintillator, of a particle beam incident upon the detector stack along said axis. The particle beam may be a therapeutic beam. The particle beam may be a proton beam. The detector stack as a whole thus produces a scintillation light profile indicative of the dose deposition profile of the beam within the detector stack. The dose deposition profile can be described by way of a Bragg peak. However, it has been observed that the scintillation light profile differs from the theoretical Bragg peak shape because of quenching effects, which arise as a consequence of a particle (such as a proton) producing less scintillation light as its energy reduces as it transits the detector stack. These effects cause the observed scintillation light to be less than would be expected from the Bragg peak alone, by a degree which increases as the particle passes through the detector stack. If these effects are not taken into account, the height of the energy deposition peak will be underestimated.

The apparatus further comprises readout circuitry configured to measure the scintillation light of each scintillator layer.

The apparatus further comprises dose profile determination circuitry configured to determine a dose profile, for example a longitudinal energy deposition profile, of said particle beam within the detector stack. This determining is based on the measured scintillation light of each scintillator layer, and a quenching correction. A more accurate determination of the dose profile can thus be performed than with a comparative apparatus in which no quenching correction is performed.

The present example thus allows a longitudinal dose profile to be determined by a single apparatus, significantly faster than with a comparative apparatus in which, for example, multiple measurements are taken with plastic blocks of different thickness between the beam and a measuring apparatus.

The present example also offers advantages over comparative systems in which an alternative detector type such as a multi-layer ionisation chamber is used: whilst such detectors can provide accurate results, they are expensive and sensitive to ambient conditions, as well as being time consuming to set up and process the data. Furthermore, they are typically relatively fragile. As a consequence of using scintillators the present example, conversely, is less expensive and less sensitive to ambient conditions, whilst also being less time consuming to set up and use. Scintillators are also less fragile than ionisation chambers, and so the present example is more physically robust and thus more able to withstand rough usage in a fast-paced clinical environment. As another advantage exhibited by some examples of the present disclosure, some types of plastic scintillator have a density close to that of water: as described elsewhere herein, such scintillators simplify the determination of water-equivalent parameters such as a water equivalent path length because energy deposition properties, such as the range of particles within the scintillator, are similar to those that would occur in water. This can reduce or eliminate the extent to which a conversion is to be performed to determine water equivalent parameters, thereby reducing computing complexity.

In an example, the determining of the dose profile of the particle beam comprises fitting a theoretical energy deposition profile to the measured scintillation light of each scintillator layer, said theoretical energy deposition profile comprising said quenching correction. For example, the theoretical energy deposition profile may be based on a Bragg curve modified by the quenching correction. This provides a computationally efficient way in which the dose profile can be determined from the scintillation light profile. For additional computational efficiency, the Bragg curve may be based on Bortfeld's analytical approximation (as described in more detail below).

The quenching correction may be based on Birks' law. This provides a more accurate quenching correction than, for example, merely scaling up the measured scintillation light profile: such scaling can cause the width of the Bragg peak, and the particle range, to be overestimated.

In an example, the determining of the dose profile of the particle beam within the detector stack comprises, based on the measured scintillation light of each scintillator layer, determining an emitted light profile of the particle beam along said axis within the particle detector stack. As explained above, this emitted light profile may be expected to differ from the theoretical Bragg peak shape as a consequence of quenching effects. The quenching correction may thus be applied to the determined emitted light profile of the particle beam, to determine the dose profile. Quenching effects can thus be accounted for, improving the accuracy of the determined dose profile.

In an example, the readout circuitry comprises, for each scintillation layer of the particle detector stack, at least one photodiode configured to receive the scintillation light of that scintillator layer. Photodiodes provide a way of measuring the output light which is significantly cheaper and more physically robust than comparative alternatives, such as a silicon pixel detector. Whilst it might have been expected that photodiodes would not be sufficiently sensitive to use for measuring scintillation light, it has been observed that the quantity of scintillation light produced by particle beams such as therapeutic particle beams is sufficiently large that photodiodes can provide accurate measurements.

In an example, the dose profile determination circuitry comprises dedicated circuitry (for example implemented on one or more field-programmable gate arrays) configured to receive, from the readout circuitry, an indication of the measured scintillation light of each scintillator layer, and to output an indication of the determined dose profile. The determined dose profile can thus be determined significantly more quickly and efficiently than with other examples in which the dose profile is determined by general-purpose circuitry (such as processing circuitry of a general-purpose computer). The dedicated circuitry may, for example, be mounted with the other apparatus components in a portable robust unit, thereby improving the usability and physical robustness of the apparatus. The dedicated circuitry may be configured to interface with a computer via a standard interface such as a Universal Serial Bus (USB) connector.

In other examples, the dose profile determination circuitry is implemented within general-purpose circuitry, such as a central processing unit or graphics processing unit of a computer that is communicatively coupled to the readout circuitry. For example, raw outputs may be provided to such a computer from the readout circuitry, for dose profile determination to be performed.

The scintillator layers may comprise plastic scintillators. These are particularly efficient in terms of costs, as well as being physically robust. Each scintillator layer may have a density substantially equal to a density of water, which simplifies the process of determining a water equivalent path length, which is a standard measure of the depth of a Bragg peak for purposes including QA of particle beams such as therapeutic particle beams.

In an example, each scintillator layer has a transverse size at least as large as an expected scanning field of the particle beam. This allows the determined dose profile to accurately reflect the complete dose delivered by the particle beam across its expected scanning field, thereby improving the accuracy of the QA process.

According to an aspect of the present disclosure, there is presented a method for determining a dose profile of a particle beam, the method comprising:

receiving the particle beam at a particle detector stack comprising a plurality of scintillator layers, the particle beam being parallel to a longitudinal axis of the particle detector stack;

measuring scintillation light of each scintillator layer of the particle detector stack;

determining a dose profile of said particle beam within said particle detector stack, said determining being based on:

the measured scintillation light of each scintillator layer; and a quenching correction.

The method may be carried out by the above-described apparatus.

In examples, the method further comprises determining, based on the determined dose profile, at least one of:

a range of the particle beam within the particle detector stack;

a depth of an energy deposition peak within the particle detector stack;

a width of the energy deposition peak of the particle beam within the particle detector stack; and a water equivalent path length of the particle beam within the particle detector stack.

Various beam parameters can thereby be determined, to accurately characterise the characteristics of the dose profile. These parameters can be used for QA, for example for a therapeutic particle beam. For example, if it is determined that the determined parameters have values within allowable tolerances, it can be concluded that the particle beam is behaving correctly in terms of the dose that is to be delivered to a patient. Conversely, if it is determined that one of more of the parameters have a value outside allowable tolerances, it can be concluded that the particle beam would not deliver the correct dose to a patient. This may for example mean that the beam equipment should be re-calibrated or serviced.

The present technique will be described further, by way of illustration only, with reference to examples thereof as illustrated in the accompanying drawings, in which.

Examples of the present disclosure will now be described with reference to the Figures.

Figure 1:
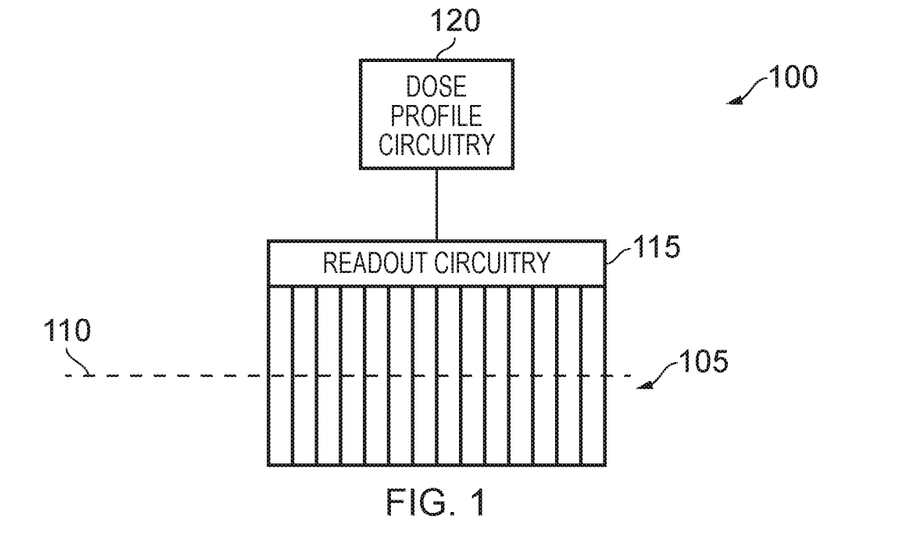
FIG. 1 shows schematically an apparatus according to examples of the present disclosure.

FIG. 1 shows schematically an apparatus 100 according to examples of the present disclosure.

The apparatus 100 comprises a particle detector stack 105 comprising a plurality of scintillator layers. Each scintillator layer is disposed along an axis 100 such that the axis projects through each layer. The scintillator layers are thus laid out in a manner akin to a sliced loaf of bread.

Figure 2:
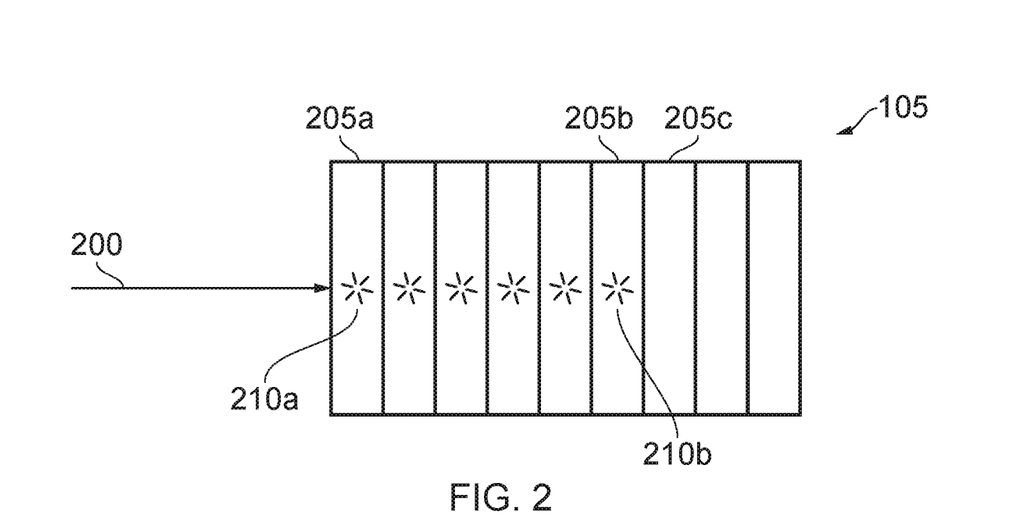
FIG. 2 shows schematically the detector stack of the apparatus of FIG. 1.

FIG. 2 shows schematically the detector stack 105 of the apparatus 100, when a particle beam 200 is incident upon the stack 105 along the axis 110. The particle beam 200 may for example be a therapeutic particle beam, such as for proton beam therapy.

As the particle beam passes through the first scintillator layer 205a, energy is deposited in that scintillator layer. Consequently, scintillation light 210a indicative of the energy deposition is produced. However, because of quenching effects, the scintillation light profile differs from the Bragg peak shape that might naively be expected. These quenching effects are described in more detail below.

The particle beam 200 deposits energy in each consecutive scintillator layer, thereby losing energy, until layer 205b is reached in which the energy of the particle beam 200 is depleted. A final energy deposit therefore occurs in layer 205b, such that layer 205b represents the range of the particle beam 200 within the detector stack. Consequently, no energy is deposited in layer 205c and subsequent layers, and thus no scintillation light is emitted in those layers.

The intensity of scintillation light in a given scintillator layer corresponds to the energy deposited in that layer. The scintillation light profile across the detector stack 105 is therefore indicative of the longitudinal energy deposition dose profile of the particle beam 200 within the detector stack 105.

In one example, the scintillation layers are up to 5 millimetres thick. This allows a relatively large number of measurements to be made, to provide accurate characterisation of the dose profile. The scintillator layers may be optically isolated from each other, to ensure that the measurement of scintillation light in one layer is independent of light produced in neighbouring layers.

Returning to FIG. 1, the apparatus 100 comprises readout circuitry 115. The readout circuitry is configured to measure the scintillation light that is produced within each scintillator layer of the detector stack 105.

The apparatus 100 further comprises dose profile determination circuitry 120. The dose profile determination circuitry is configured to determine a dose profile of the particle beam 200 within the detector stack 105. This determining is based on the measured scintillation light of each scintillator layer, as measured by the readout circuitry 115, and a quenching correction. This may for example include determining a range of the particle beam 200 within the detector stack 105. This range may be expressed as a water equivalent path length. Examples in which the scintillators are plastic scintillators can reduce the complexity of determining the water equivalent path length, because some plastic scintillators have a density close to that of water and so the dose profile within a plastic scintillator stack can be similar to the dose profile within water. The particle beam range within such a scintillator stack is thus close to the range of that particle beam in water, i.e. the water equivalent path length.

The aforementioned quenching effects will now be described with reference to FIGS. 3A and 3B.

Figure 3A:
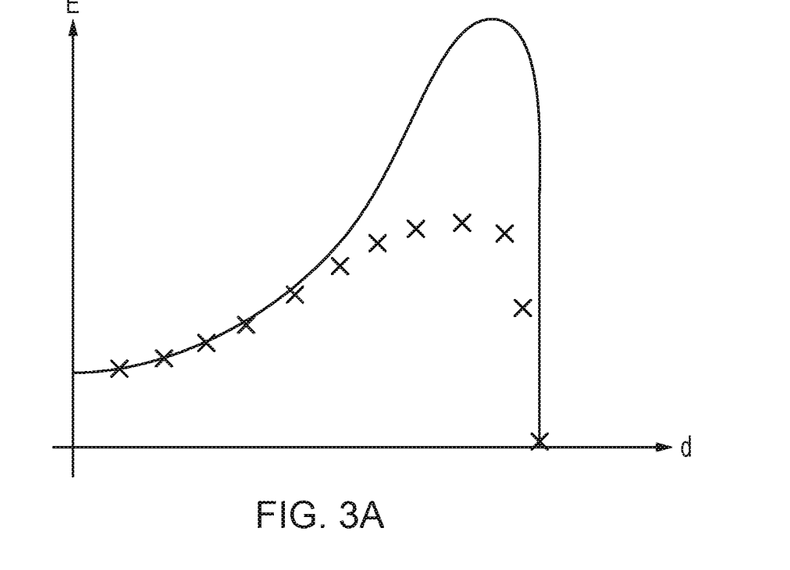
FIGS. 3A and 3B illustrate quenching effects in a scintillator.

FIG. 3A schematically depicts the energy deposition, in a medium such as the detector stack 105 of FIGS. 1 and 2, of a particle beam. The energy deposition is shown as a graph (solid line) of energy (E) against depth within the medium (d). The graph exhibits a Bragg peak shape, in which the energy deposition is concentrated in a peak located immediately before the particle comes to rest. This characteristic peaked shape is advantageous in a therapeutic setting, because the beam can be configured such that the peak is located within a tumour. This maximises energy deposition to the tumour, and minimises energy deposition within healthy tissue.

FIG. 3A also schematically shows the corresponding scintillation light within a series of scintillators such as the detector stack 105. The scintillation light is shown as a series of crosses, each representing the light emitted within one scintillator layer. It can be seen that at relatively low levels of deposited energy, the scintillation light closely tracks the deposited energy. However, at higher levels of deposited energy (i.e. within the peak), the emitted scintillation light is lower than would be expected from the deposited energy. This difference is termed "quenching". If quenching effects are not corrected, the overall deposited energy could be significantly under-estimated, thereby preventing accurate characterisation of the interaction of the particle beam with the medium through which it travels.

As an example of quenching, in general, in an organic scintillator, light is produced through the de-excitation of specific energy levels in organic molecules. All alternative de-excitation modes that do not involve the production of a scintillation photon can be grouped under the term "quenching": this results in a non-linear response in the scintillation light output to absorbed dose. The differential light output $dL/dz$ of an organic scintillator can be described as a nonlinear function of the differential energy loss $dE/dz$. The increased quenching can be caused by "damaged" molecules along the track of the ionising particle. The density of the damaged molecules therefore depends on the ionisation density of the traversing particle. This relation can be described by Birks' law. Birks' law gives a good approximation of the light yield at least for ionisation densities up to 100 MeV/(g cm$^{-2}$). In examples, the average ionisation density of protons along the Bragg curve can be found to be less than 25 MeV/(g cm$^{-2}$), justifying the use of Birks' formula in proton therapy.

Figure 3B:
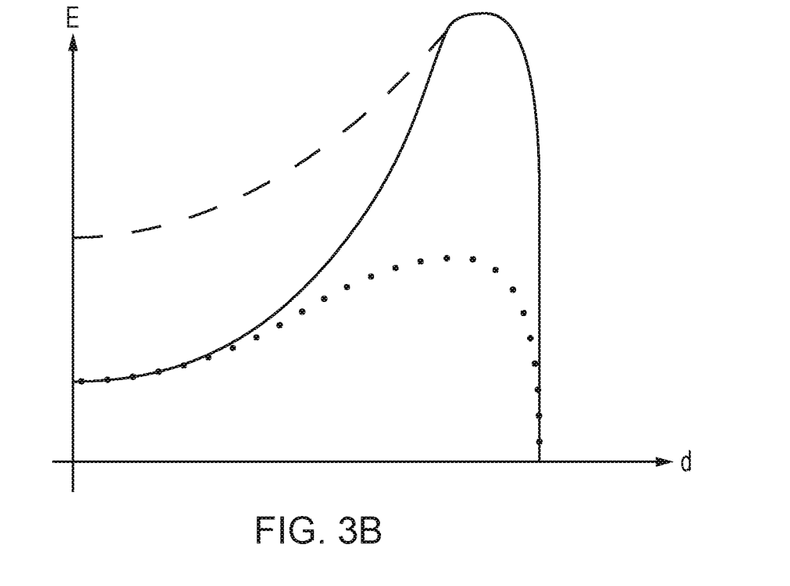

FIG. 3B illustrates a method of correcting for quenching effects. A graph of deposited energy (solid line) is shown, as for FIG. 3A. The corresponding scintillation light profile is also shown (dotted line), exhibiting quenching effects.

One method for correcting for quenching effects is to scale up the quenched scintillation light profile to the unquenched Bragg peak height. This allows the peak energy deposition to be more accurately determined. However, as a consequence of the flatter shape of the quenched scintillation light profile as compared with the unquenched Bragg peak, this causes the energy deposition spread (i.e. the peak width) to be overestimated, and thus also causes the overall energy deposition to be overestimated.

A more accurate quenching correction can be performed by fitting the measured scintillation light profile to a Bragg curve modified by a quenching correction that takes into account the energy dependency of the quenching effects. For example, as described in more detail below, this correction may be based on Birks' law.

Figure 4:
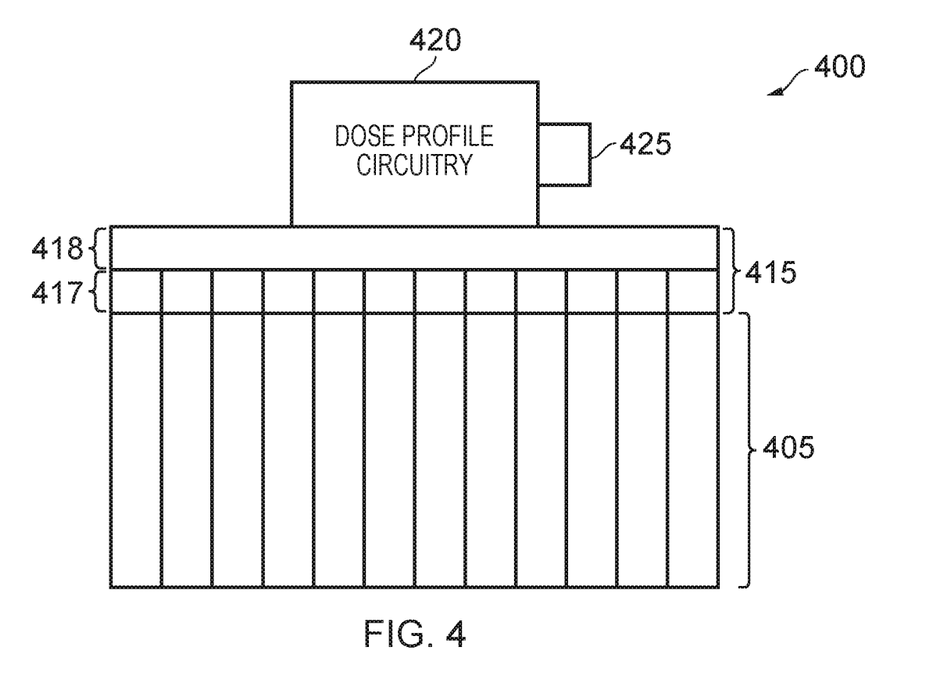
FIG. 4 schematically depicts an apparatus according to an example of the present disclosure.

FIG. 4 schematically depicts an apparatus 400 according to an example of the present disclosure. The apparatus 400 can be considered a particular implementation of the apparatus 100 of FIG. 1.

The apparatus 400 comprises a detector stack 405 of scintillation layers and readout circuitry 415, analogous to the detector stack 105 and readout circuitry 115 of the apparatus 100.

The readout circuitry 415 comprises a series of light detectors 417, one light detector being provided for each scintillator layer of the detector stack 417. Each light detector comprises a photodiode configured to produce a signal corresponding to an amount of scintillation light in its corresponding scintillator layer.

The readout circuitry 415 further comprises circuitry 418 configured to receive the signal from each light detector 417, and thereby determine a scintillation light profile associated with the passage of a particle beam through the detector stack 405. For example, the signal from each light detector 417 may be digitised by a corresponding analogue-to-digital converter.

The apparatus 400 comprises dose profile determination circuitry 420. The dose profile determination circuitry 420 is configured to determine a dose profile of the particle beam within the detector stack 405, based on the scintillation light profile determined by the circuitry 418 and a quenching correction. The dose profile determination circuitry may be implemented in one or more field-programmable gate arrays configured to interrogate the aforementioned analogue-to-digital converters.

The dose profile determination circuitry comprises an interface 425 from which the determined dose profile can be output. For example, this may be a USB connector or other network connection to which a computer can be connected. This computer may be provided with a graphical user interface to view the results.

The apparatus 400 is provided as a single unit which can, for example be inserted into the path of a therapeutic particle beam as part of a QA program. The nature of the apparatus 400 as a single unit means that the apparatus 400 is robust and portable, and thus able to withstand the rigours of regular (for example daily) use within a busy clinical environment, without requiring time-consuming setup and configuration. This reduces the amount of time for performing a QA program, thereby allowing more patients to be treated.

The present example also allows fast and accurate determination of dose profile characteristics such as the range. For example, the range (which may be expressed as a water equivalent path length) may be determined within an error of 0.1 millimetres within a time of the order of seconds or faster, for example in the range of 10 microseconds to 10 seconds.

The apparatus may, in some examples, be configured to be mounted directly to the nozzle of a clinical particle beam apparatus, for example using a standard clinical nozzle mount for the usage of patient-specific collimators. This further reduces the setup time.

Figure 5:
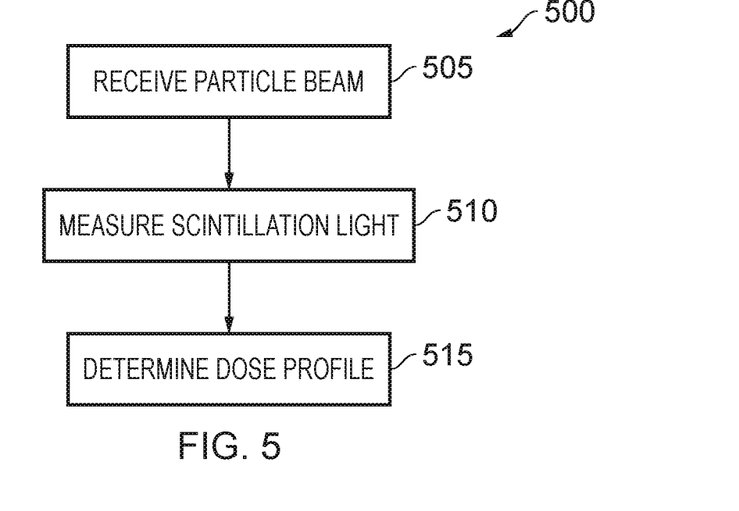
FIG. 5 is a flow diagram showing a method according to examples of the present disclosure.

FIG. 5 is a flow diagram showing a method 500 according to examples of the present disclosure.

At block 505, a particle beam is received at a particle detector stack such as the stack 105 of FIG. 1, or the stack 405 of FIG. 4. The stack comprises a plurality of scintillator layers, the particle beam being parallel to a longitudinal axis of the particle detector stack as shown in FIG. 2.

At block 510, the scintillation light of each scintillator layer of the stack is measured.

At block 515, a dose profile of the particle beam within the particle detector stack is determined. The determining is based on the measured scintillation light of each scintillator layer, and a quenching correction.

Figure 6:
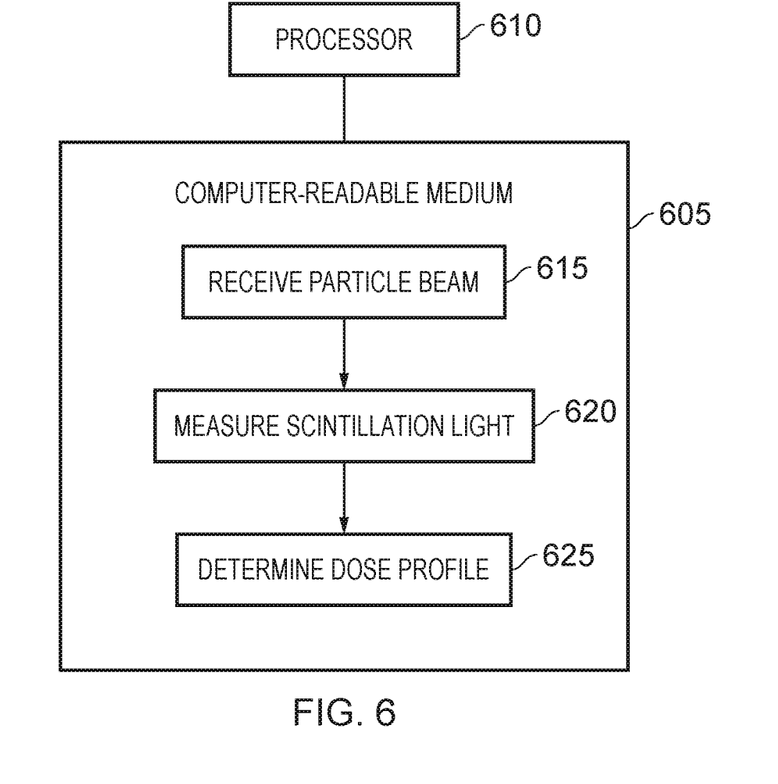
FIG. 6 depicts a computer-readable medium according to an example of the present disclosure.

FIG. 6 depicts a computer-readable medium 605 according to an example of the present disclosure. The medium may be a non-transitory medium such as a storage medium, for example a memory. Alternatively, the medium may be a transitory medium such as a carrier signal or storage medium.

The medium 605 comprises computer-readable instructions 615, 620, 625 which, when executed by at least one processor 610, cause the at least one processor 610 to perform a method of determining a dose profile of a particle beam, such as the method described above with reference to FIG. 5.

In the present example the method comprises, at block 615, receiving the particle beam at a particle detector stack comprising a plurality of scintillator layers, the particle beam being parallel to a longitudinal axis of the particle detector stack.

The method comprises, at block 620, measuring output light of each scintillator layer of the particle detector stack.

The method comprises, at block 625, determining a dose profile of said particle beam within said particle detector stack. The determining is based on the measured output light of each scintillator layer, and a quenching correction.

A method of determining a modified Bragg peak including a quenching correction, termed a "quenched Bragg peak", will now be described. The measured scintillation light profile can be fitted to this curve, which corresponds to the dotted line of FIG. 3B. Based on this, parameters of the underlying dose profile can be determined, such as range and width of the Bragg peak.

A formula for a quenched Bragg curve can be determined by combining Birk's formula for quenching with Bortfeld's analytical approximation of a proton Bragg curve. This serves to make Bortfeld's approximation applicable to scintillation detectors.

In order to produce an analytical approximation of a Bragg curve, a starting point is the energy fluence $\Psi(z)$, being the product of the local particle fluence $\Phi(z)$ and the remaining mean proton energy $E(z)$. In an analogous way, the light fluence $\Theta(z)$ is considered, being the product of the local particle fluence $\Phi(z)$ and the remaining mean light output $L(z)$ of the beam.

$$\Theta(z) = \Phi(z)L(z)$$

The scintillation light output U at depth z can be obtained through differentiation of $\Theta$ and normalisation to the material density $\rho$:

$$U(z) = -\frac{1}{\rho}\frac{d\Theta}{dz} = -\frac{1}{\rho}\left(\Phi(z)\frac{dL(z)}{dz} + \frac{d\Phi(z)}{dz}L(z)\right)$$

The proton fluence reduction represented by the factor $d\Phi/dz$ can be interpreted as being caused by non-elastic nuclear reactions that eliminate protons from the original beam. However, only a fraction of the energy going into these reactions is deposited locally and can therefore contribute to the production of scintillation light. Therefore, Bortfeld's approximation includes a factor Y which represents the fraction of locally absorbed energy from non-elastic nuclear interactions. This gives an expression for the depth-light curve $\hat{Q}(z)$.

$$\hat{Q}(z) = -\frac{1}{\rho}\left(\Phi(z)\frac{dL(z)}{dz} + \gamma\frac{d\Phi(z)}{dz}L(z)\right)$$

In its current form $\hat{Q}(z)$ does not account for range straggling. A good approximation is to fold $\hat{Q}(z)$ with a Gaussian with a constant standard deviation $\sigma$ in order to include the effect of range straggling. The initial depth dependence $\sigma(z)$ can be neglected due to the relative flatness of the Bragg curve's plateau upstream of the Bragg peak. The minimum value of $\sigma$ is determined by the range straggling of a monoenergetic beam $\sigma_{mono}$. In addition to that, $\sigma$ will further increase if the proton beam has an initial proton energy distribution with a non-zero width. Folding a Gaussian with standard deviation $\sigma$ into $\hat{Q}(z)$ yields an analytical approximation of a quenched Bragg curve Q(z).

$$Q(z) = (\hat{Q})(z) = \int_0^{R_0} \hat{Q}(z')\frac{1}{\sqrt{2\pi}\sigma}\exp(-(z-z')^2/2\sigma^2)dz'$$

In order to calculate the depth-light curve expressions need to be found for the light output and the particle fluence. First, the quenched light output of a scintillator is considered. According to Birk's Law, the light yield dL in a path segment dz is a function of the differential energy loss dE/dz.

Just like dE/dz, dL/dz is a negative function as it describes the release of light or a decrease of potential light output. Since Birks' constant can be defined as being positive, the absolute value of the differential energy loss must be used, introducing a negative into the definition of dL/dz. Alternatively, Birks' constant can be defined as being negative.

$$\frac{dL}{dz} = -\frac{S}{\left|\frac{dE}{dz}\right|^{-1} + b}$$

Here, S is the scintillation light constant of the material and b is Birks' constant. Integration of dL/dz from z to the end of the proton path at $R_0$ gives the remaining light output L(z). The remaining light output is positive, just like the remaining energy E(z) of a proton.

$$L(z) = -\int_z^{R_0} \frac{dL}{dz'} dz'$$

In order to obtain an expression for the energy loss in the medium, Bortfeld's derivation can again be used. At the heart of Bortfeld's Bragg curve is the relation between the proton range $R_0$ and the initial beam energy $E_0$, approximated by a power law. The mean proton range $R_0$ coincides with the 80% fall-off of the depth-dose curve. The parameters $\alpha$ and p are material-specific constants that can be determined from a fit of the power law to experimental or simulated data. The range-energy relationship (Geiger's rule) is given by:

$$R_0 = \alpha E_0^p$$

The residual proton energy E at depth z can be written as:

$$E(z) = \alpha^{-1/p}(R_0 - z)^{1/p}$$

Differentiation yields the differential energy loss:

$$\frac{dE(z)}{dz} = -\frac{1}{p\alpha^{1/p}}(R_0 - z)^{1/p-1}$$

The range-energy relation also allows the decomposition of $\sigma$ into a monoenergetic part and a part that takes into account the initial beam energy spread $\sigma_E$. Bortfeld's approximation uses the relation:

$$\sigma^2 = \sigma_{mono}^2 + \sigma_E^2 \alpha^2 p^2 E_0^{2p-2}$$

where $\sigma_E$ is the Gaussian width of the initial proton beam energy spectrum and $\alpha$ and p are parameters of Geiger's rule. For water, Bortfeld found that $\sigma_{mono}$ can be approximated by $\sigma_{mono} = 0.012 R_0^{0.935}$.

The last undefined quantity in the formula for Q(z) is the proton fluence. In Bortfeld's approximation, the proton fluence $\Phi(z)$ can be normalised as:

$$\Phi(z) = \Phi_0 \frac{1 + \beta(R_0 - z)}{1 + \beta R_0}$$

with $\beta$ being a slope parameter for the linear approximation of the fluence reduction due to non-elastic nuclear reactions and $\Phi_0$ being the initial proton fluence at depth $z=0$. Differentiation gives the change in proton fluence:

$$\frac{d\Phi(z)}{dz} = -\Phi_0 \frac{\beta}{1 + \beta R_0}$$

By inserting the above relations into the equation for Q(z), an analytical approximation of a Bragg curve can be obtained:

$$Q(z) = \int_0^{R_0} \frac{1}{\rho} \left[ \Phi_0 \frac{1 + \beta(R_0 - z')}{1 + \beta R_0} \frac{S}{\left(\frac{1}{p\alpha^{1/p}}(R_0 - z')^{1/p-1}\right)^{-1} + b} + \gamma \Phi_0 \frac{\beta}{1 + \beta R_0} \times \right.$$
$$\left. \int_{z'}^{R_0} \frac{S}{\left(\frac{1}{p\alpha^{1/p}}(R_0 - z'')^{1/p-1}\right)^{-1} + b} dz'' \right] \frac{1}{\sqrt{2\pi}\sigma} \exp\left(-(z-z')^2/2\sigma^2\right) dz'$$

The integration over z' and z" can be carried out numerically.

The measured scintillation profile can be fit to the above quenched Bragg curve. Based on this, characteristics of the energy deposition (such as range and peak spread) can be determined. In an example of a polystyrene-based scintillator, the following values may be used for the variables and constants in the above equation for Q(z):

| Variable | Description | Value | Unit |
| --- | --- | --- | --- |
| p | Exponent of range-energy relation | 1.753 | 1 |
| $\alpha$ | Proportionality factor | 0.0237 | mm/MeV$^p$ |
| $\beta$ | Slope parameter of fluence reduction | 0.0012 | mm$^{-1}$ |
| $\gamma$ | Fraction of locally absorbed energy | 0.6 | 1 |
| $\rho$ | Density of the scintillator | 1.03 | g/cm$^3$ |
| b | Birks' constant | 0.126 | mm/MeV |
| S | Scintillation light constant | 10,000 | photons/MeV |
| $R_0$ | Proton range | fit parameter | mm |
| $\sigma$ | Width of Gaussian range straggling | fit parameter | mm |
| $\Phi_0$ | Fluence factor | fit parameter | particles/mm$^2$ |

The improvement provided by the above-described method will now be illustrated with reference to FIGS. 7 and 8.

Figure 7:
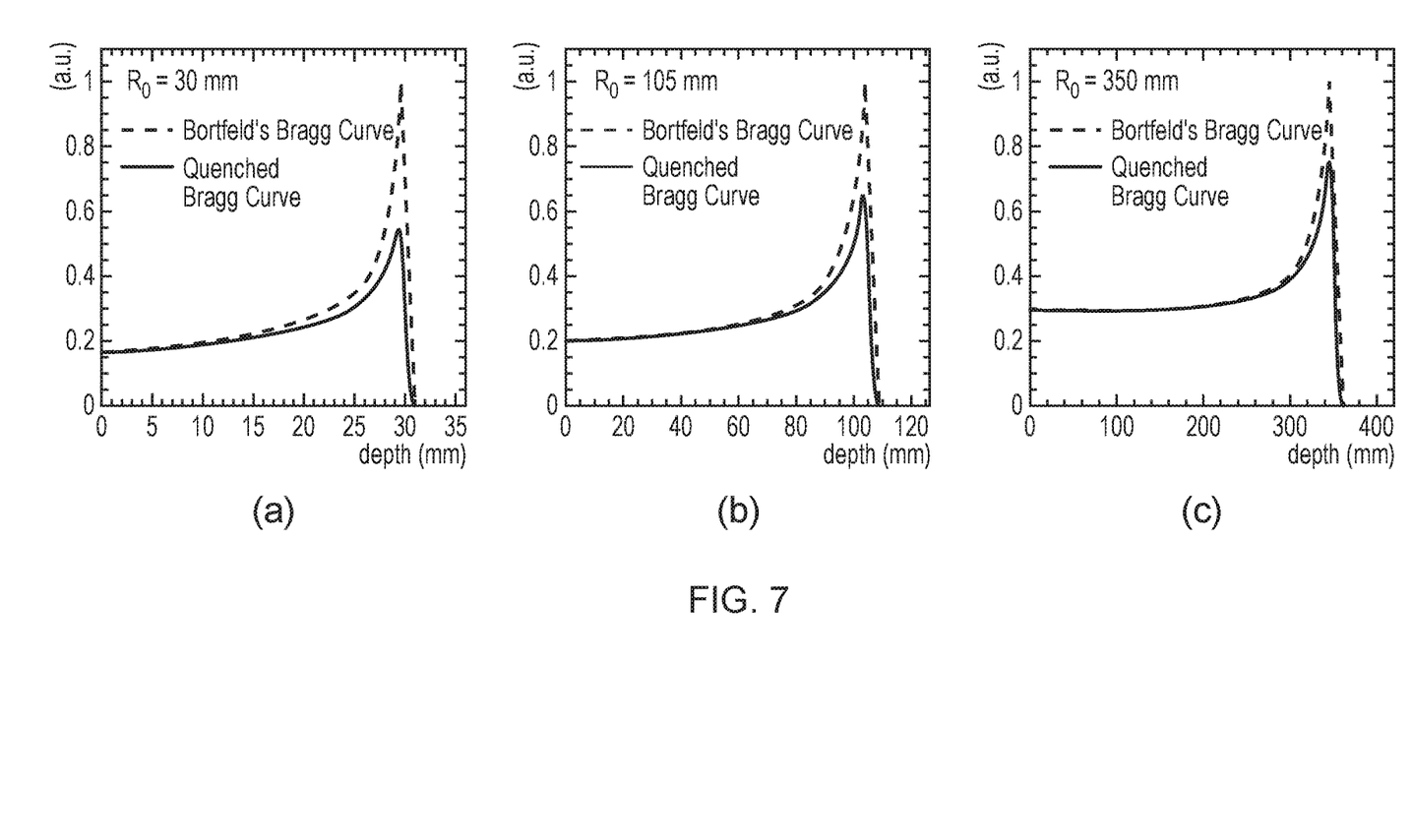
FIGS. 7 and 8 illustrate the effectiveness of techniques described herein.

FIG. 7 shows three graphs comparing an unquenched Bragg curve (dashed line) with a quenched Bragg curve according to the equation above (solid line) for three proton ranges $R_0$. The reduction of the Bragg peak, arising from quenching effects, can be seen.

Figure 8:
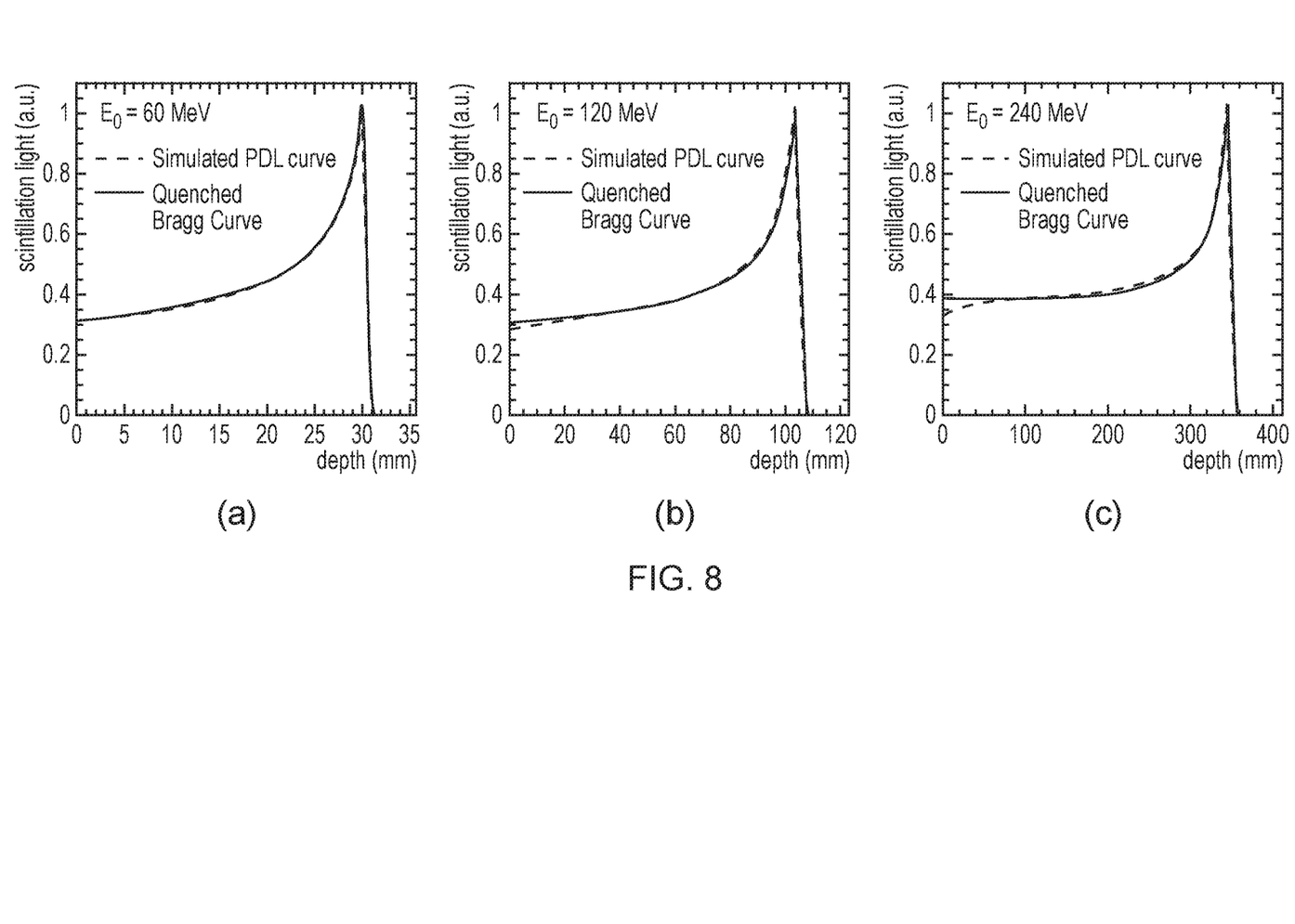

FIG. 8 shows three graphs comparing the quenched Bragg curve according to the equation above with a simulated percent depth-light curve in a polystyrene-based scintillator for three proton energies $E_0$. The simulated curves are based on a Monte-Carlo simulation using Monte Carlo simulation toolkit Geant4-10-02. A step size of 100 micrometre and a range cut of 200 micrometre were used. A monoenergetic proton beam of 1,000,000 particles with an initial transverse beam radius of zero millimetres was used for all simulations. A 10×10×40 cm$^3$ polystyrene $((C_8H_8)_n)$ block was modelled with a density of 1.03 g/cm$^3$ and a Birks' constant of 0.126 mm/MeV. The depth-light curve was obtained by recording the production depth z of each optical photon produced in the scintillator, effectively integrating over the whole lateral extension of the polystyrene block. The resulting depth-light curve is then obtained by binning the production depth z into a histogram 155 with 0.1 millimetre bin width.

The quenched Bragg curves of FIG. 8 are produced as a least-square fit of the above-described quenched Bragg curve to the simulated depth-light curve. The three free parameters of the fit are range $R_0$, range straggling $\sigma$ and fluence $\Phi_0$. All other parameters are kept constant. Graphs (a) to (c) of FIG. 8 show the fit for three typical clinical beam energies. The energy $E_0$ in the plots corresponds to the simulated proton energy. The range $R_0$ is the fitted range parameter from the quenched Bragg curve. Graph (a) shows an excellent agreement of the analytical approximation with the simulation at 60 MeV. However, small discrepancies between the fit and the simulation arise at higher beam energies, as can be seen in graphs (a) and (b). The difference is particularly visible in the plateau upstream of the Bragg peak. The discrepancies can be explained by the coarse model of nuclear interactions in Bortfeld's analytical approximation which is also present in the quenched Bragg curve model. Dose build-up of secondary protons is responsible for the disagreement between the quenched Bragg curve and the simulation at the entrance to the medium, which is particularly visible for very high beam energies (graph (c) for z<100 mm). However, the overall agreement between the model and the simulation is good, especially in the distal fall-off of the depth-light curve.

Through use of the above described techniques, it will be appreciated that improved methods and apparatus are provided for measuring properties of charged particle beams.

Methods described herein may be performed in hardware and/or software. Such hardware may be a general-purpose processor, or a more specific unit such as an application-specific integrated circuit or a field-programmable gate array.

Although illustrative examples of the invention have been described in detail herein with reference to the accompanying drawings, it is to be understood that the invention is not limited to those precise examples, and that various changes, additions and modifications can be effected therein by one skilled in the art without departing from the scope of the invention as defined by the appended claims. For example, various combinations of the features of the dependent claims could be made with the features of the independent claims without departing from the scope of the present invention.

The invention claimed is:

1. A particle beam dose profile measurement apparatus comprising:
   a particle detector stack comprising a plurality of scintillator layers, wherein:
      each scintillator layer of the detector stack is disposed along an axis of the apparatus such that the axis projects through each layer; and
      each scintillator layer is configured to produce scintillation light indicative of an energy deposition, in that scintillator, of a particle beam incident upon the detector stack along said axis,
   readout circuitry configured to measure the scintillation light of each scintillator layer; and
   dose profile determination circuitry configured to determine a dose profile of said particle beam within the detector stack, said determination is based on:
      fitting a theoretical energy deposition profile to the measured scintillation light of each scintillator layer, wherein said theoretical energy deposition profile comprises a quenching correction.

2. The apparatus of claim 1, wherein the theoretical energy deposition profile is based on a Bragg curve modified by said quenching correction.

3. The apparatus of claim 2, wherein the Bragg curve is based on Bortfeld's analytical approximation.

4. The apparatus of claim 1, wherein the quenching correction is based on Birks' law.

5. The apparatus of claim 1, wherein the determining the dose profile of the particle beam within the particle detector stack comprises:
   based on the measured scintillation light of each scintillator layer, determining an emitted light profile of the particle beam along said axis within the particle detector stack; and
   applying the quenching correction to the determined emitted light profile of the particle beam, to determine the dose profile.

6. The apparatus of claim 1, wherein the readout circuitry comprises, for each scintillation layer of the particle detector stack, at least one photodiode configured to receive the scintillation light of that scintillator layer.

7. The apparatus of claim 1, wherein the dose profile determination circuitry comprises dedicated circuitry configured to:
   receive, from the readout circuitry, an indication of the measured scintillation light of each scintillator layer; and
   output an indication of the determined dose profile.

8. The apparatus of claim 7, wherein the dedicated circuitry is a field-programmable gate array.

9. The apparatus of claim 1, wherein each scintillator layer comprises a plastic scintillator.

10. The apparatus of claim 1, wherein each scintillator layer has a transverse size at least as large as an expected scanning field of the particle beam.

11. The apparatus of claim 1, wherein the particle beam is a therapeutic particle beam.

12. The apparatus of claim 1, wherein the particle beam is a proton beam.

13. The apparatus of claim 1, wherein the dose profile is a longitudinal energy deposition profile.

14. The apparatus of claim 1, wherein each scintillator layer has a density substantially equal to a density of water.

15. A method for determining a dose profile of a particle beam, the method comprising:
   receiving the particle beam at a particle detector stack comprising a plurality of scintillator layers, the particle beam being parallel to a longitudinal axis of the particle detector stack;
   measuring scintillation light of each scintillator layer of the particle detector stack; and
   determining a dose profile of said particle beam within said particle detector stack, said determining being based on:
      fitting a theoretical energy deposition profile to the measured scintillation light of each scintillator layer, wherein said theoretical energy deposition profile comprises a quenching correction.

16. A method according to claim 15, comprising:
   based on the determined dose profile, determining at least one of:
      a range of the particle beam within the particle detector stack;
      a depth of an energy deposition peak within the particle detector stack;
      a width of the energy deposition peak of the particle beam within the particle detector stack; and a water equivalent path length of the particle beam within the particle detector stack.

17. A method according to claim 15, comprising determining the dose profile for at least one predetermined particle beam energy.

18. A computer readable medium comprising computer-readable instructions which, when executed by at least one processor, cause the at least one processor to perform a method of determining a dose profile of a particle beam, the method comprising:

receiving the particle beam at a particle detector stack comprising a plurality of scintillator layers, the particle beam being parallel to a longitudinal axis of the particle detector stack;

measuring output light of each scintillator layer of the particle detector stack; and determining a dose profile of said particle beam within said particle detector stack, said determining being based on:

fitting a theoretical energy deposition profile to the measured output light of each scintillator layer, wherein said theoretical energy deposition profile comprises a quenching correction.

* * * * *